*Roos & White,*
*Harness Trimmings,*
Nº 58,352.  Patented Sep. 25, 1866
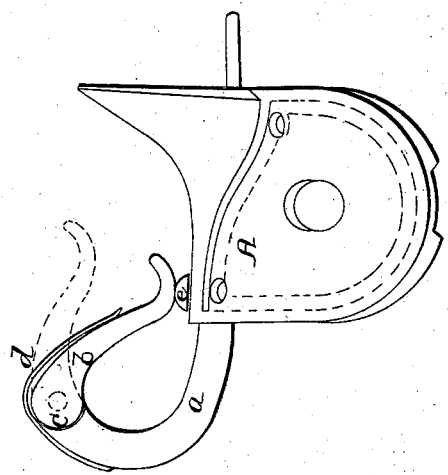
Witnesses;
J. A. Davis
James C. Brown
Inventors:
George Roos
Michael White
by J. Fraser & Co. Attys

UNITED STATES PATENT OFFICE.

GEO. ROOS AND MICHL. WHITE, OF BUFFALO, NEW YORK, ASSIGNORS TO THEMSELVES AND CHAS. W. DANIELS.

IMPROVED PAD-HOOK.

Specification forming part of Letters Patent No. 58,352, dated September 25, 1866.

*To all whom it may concern:*

Be it known that we, GEORGE ROOS and MICHAEL WHITE, both of the city of Buffalo, in the county of Erie and State of New York, have invented a new and useful Improvement in Pad-Hooks for Harnesses; and we do hereby declare that the following is a full and exact description thereof, reference being had to the accompanying drawing, making part of this specification.

The figure represents a side view of the ordinary pad-tree with our improvement applied thereto.

It is the object of our invention to produce a pad-hook which may be applied to any form of the ordinary pad-tree, by which the check-rein is securely retained in place when inserted, and cannot become accidentally disengaged therefrom, and in which it may be as easily and conveniently inserted or removed, when desired, as with the ordinary hook.

As represented in the drawing, A indicates the pad-tree of a harness, which may be of any desired form and construction. The hook proper is formed in two parts or sections, the base $a$ of which is rigidly bolted to the pad-tree in the ordinary manner, and the point or extremity $b$ is jointed at $c$ with the base or main body of the hook, as shown.

To the base part $a$, near the joint, is secured, by riveting or otherwise, a spring, $d$, which may be of any desired form, but is preferably bent to fit the curved contour of the hook, which is made to press upon the point $b$, as represented, and force it down firmly against the head $e$ of the connecting-bolt or any other suitable bearing, thereby leaving no opening in the hook through which the check-rein may escape or become disconnected, as is frequently the case where the ordinary hook is employed.

When it is desired to check or uncheck the horse, by simply raising the point $b$, as shown in red lines, an opening is formed, through which the check-rein may pass, as in the ordinary manner; but when force is removed, the action of the spring $d$ will return the point or extremity $b$ back to its former position.

In the pad-hooks ordinarily used the driving-reins and other portions of the harness often become accidentally caught, thereby preventing the free action of those parts, which is frequently a source of much difficulty, often causing parts of the harness so entangled to become broken, and giving unnecessary annoyance to the horse.

By this construction it is obvious that these difficulties will be entirely avoided, as no opening can be formed in our hook except by forcibly raising the jointed portion $b$.

The advantages of this improvement are at once apparent. It will be perceived that the pad-hook herein described may be applied to trees of various kinds, as its connection with the tree remains unchanged.

What we claim as our invention, and desire to secure by Letters Patent, is—

Forming a pad-hook for harnesses in two parts or jointed sections, $a\ b$, the one rigidly attached to the tree and the other movable on its pivot-axis, in combination with a spring, $d$, and bearing $e$, or its equivalent, constructed and arranged substantially as herein set forth.

In witness whereof we have hereunto signed our names in the presence of two subscribing witnesses.

GEORGE ROOS.
MICHAEL WHITE.

Witnesses:
J. FRASER,
J. A. DAVIS.